(12) United States Patent
Suzuki

(10) Patent No.: US 6,317,199 B1
(45) Date of Patent: *Nov. 13, 2001

(54) INDICATOR FOR AN OPTICAL INSTRUMENT

(75) Inventor: Shinichi Suzuki, Saitama (JP)

(73) Assignee: Asahi Kogaku Kogyo Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/083,963

(22) Filed: May 26, 1998

(30) Foreign Application Priority Data

May 23, 1997 (JP) .................................................. 9-133844

(51) Int. Cl.[7] .............................. G01C 3/08; G03B 3/00; G03B 13/20
(52) U.S. Cl. ............................. 356/4.01; 396/89; 396/139
(58) Field of Search .................... 396/89, 139; 356/4.01, 356/4.03, 4.04, 4.05, 4.06

(56) References Cited

U.S. PATENT DOCUMENTS

| | | |
|---|---|---|
| 4,113,381 | * 9/1978 | Epstein . |
| 5,231,441 | * 7/1993 | Hata . |
| 5,258,802 | * 11/1993 | Arimoto et al. . |
| 5,315,341 | * 5/1994 | Hibbard . |

FOREIGN PATENT DOCUMENTS 7-52626   11/1995   (JP) .

* cited by examiner

Primary Examiner—Stephen C. Buczinski
(74) Attorney, Agent, or Firm—Greenblum & Bernstein, P.L.C.

(57) ABSTRACT

An indicator for an optical instrument including an observational optical system to observe an image formed by an objective optical system having a focusing lens group, comprising a lens position detecting device to detect a position of the focusing lens group, a distance detecting device to obtain an object distance according to a position of the focusing lens group detected by the lens position detecting device, and a display device to display an object distance detected by the distance detecting device.

37 Claims, 10 Drawing Sheets

INDICATOR FOR AN OPTICAL INSTRUMENT

BACKGROUND OF THE INVENTION

1. Field of the Invention

The present invention relates to an indicator for an optical instrument, for example, an indicator applied to a surveying instrument such as an auto-level or a transit instrument having a telephotographic system.

2. Description of the Related Art

A surveying instrument such as an auto-level or a transit instrument is basically provided with a collimating telescope, a level, and scales for measuring a rotative angle (an azimuth angle) or an elevational angle. A typical auto-level collimating telescope is provided, in order from an object side, with an objective lens group, a focusing lens group, a horizontal compensation and erecting optical system, and an eyepiece lens group. The position of the focusing lens is adjusted according to the distance from the object, so that an image of the object may be formed on a reticle (focusing plate). The operator may thus observe the image superimposed on the reticle via the eyepiece.

Surveying instruments, such as an auto-level, did not have a distance measuring apparatus that could indicate the distance to an object, for example to a staff. In particular, although the auto-level may preferably be located at the equal distance position from two measuring points, the auto-level has no function to measure the distance. Therefore in the prior art, the position of the auto-level has usually been decided according to experience and intuition of the operator. Accordingly, it would be convenient if the distance to the measuring point could be made known to the operator.

A collimating telescope of surveying instrument in which an automatic focusing apparatus is provided is well known. According to a conventional automatic focusing apparatus, even if accurate focusing is not carried out, as long as the defocus is little enough so that the operator may feel as though the image is focused, the focusing operation would be stopped. However, the measuring of the object distance with the existence of such a defocus may result in a large object distance error.

SUMMARY OF THE INVENTION

It is an object of the present invention to provide an indicator of an optical instrument to carry out focusing by moving a focusing lens group, in which an object distance observed by an operator can be indicated to the operator.

It is another object of the present invention to provide an automatic focusing apparatus which can detect the object distance more accurately.

Since the distance of an object being viewed through a survey instrument having a collimating telescope is conventionally determined as being the distance from the objective lens group of the collimating telescope to the focusing plate, if the focal length of the objective lens group and the focusing lens group, and the distance between the objective lens group and the focusing lens group are known, the object distance can be readily determined. Namely, if the amount of movement of the focusing lens group from a reference position (for example, the position of a focusing lens group in infinity) is detected, the distance to the object can be obtained. Therefore, to achieve the object mentioned above, according to the present invention, there is provided an indicator for an optical instrument including an observational optical system to observe an image formed by an objective optical system having a focusing lens group, composing of: a lens position detecting device to detect a position of the focusing lens group, a distance detecting device to obtain an object distance according to a position of the focusing lens group detected by the lens position detecting device, and an inside-visual-field display device to display an object distance in a visual field of the observational optical system detected by the distance detecting device.

Further, according to an invention as claimed in claim 13, there is provided an indicator for an optical instrument including an observational optical system to observe an image formed on a predetermined focal plane by an objective optical system having a focusing lens group, composing of: a split optical system positioned between the objective optical system and the observational optical system, a focusing detecting device to detect a defocus amount at a position equivalent to the focal plane by receiving light divided by the split optical system, a lens driving device to drive the focusing lens group according to a defocus amount detected by the focusing detecting device so that the defocus amount becomes a smallest value, a lens position detecting device to detect a position of the focusing lens group; an object distance detecting device to detect an object distance according to a position of the focusing lens group detected by the lens position detecting device and according to the defocus amount; and an inside-visual-field display device to display an object distance in a visual field of the observational optical system detected by the object distance detecting device.

The present disclosure relates to subject matter contained in Japanese Patent Application No. 09-133844 (filed on May 23, 1997) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENTS

Figure 1:
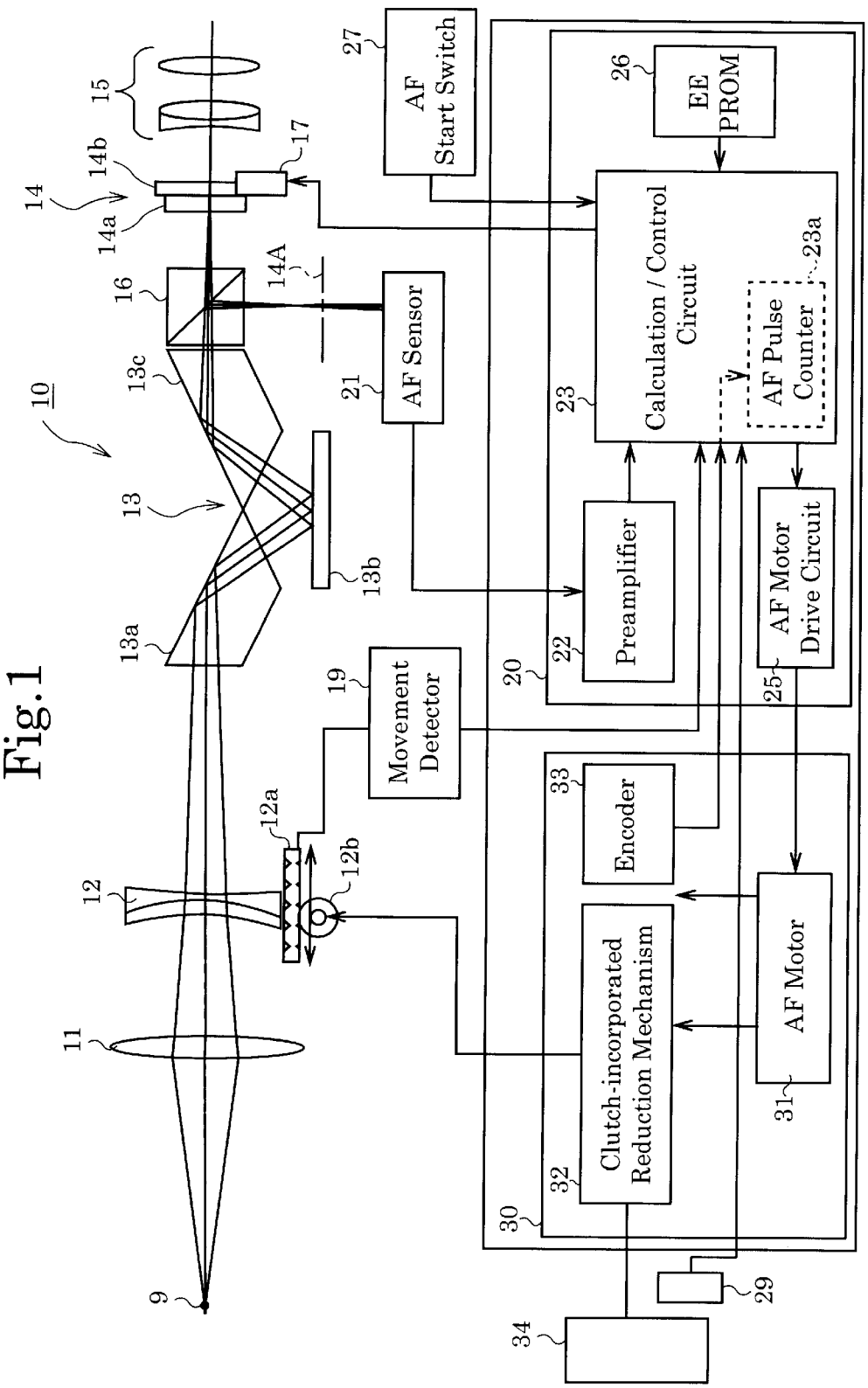
FIG. 1 is a block diagram of main elements of an embodiment of an auto-level to which the present invention is applied.

The present invention will now be described in detail with reference to drawings attached hereto. FIG. 1 shows an embodiment of an auto-level to which an automatic focusing apparatus according to the present invention is applied. An auto-level 10 consists of a collimating objective lens group 11 of positive power and a focusing lens group 12 of negative power which serve as the objective optical system, an optical horizontal compensation system 13, a spilt optical system (divided optical system) 16, a first focusing plate 14a and a second focusing plate 14b to integrally serve as a focusing plate (reticle) 14, and an eyepiece lens group 15 of positive power (observational optical system), in this order from the object side (left side of FIG. 1).

The optical horizontal compensation system 13, per se known, consists of a first compensation prism 13a, a compensation mirror 13b, and a second compensation prism 13c, and has a symmetrical shape. The optical horizontal compensation system 13 is hung from a shaft by a string or the like (not shown). The angle defined between the compensation mirror 13b and the first compensation prism 13a is identical (in absolute-value) to the angle defined between the compensation mirror 13b and the second compensation prism 13c, but are opposite in direction. The angle, for example 30° varies depending on the length of the string, etc. When the optical horizontal compensation system 13 is set so that the optical axes of the objective lens group 11 and the focusing lens group 12 are substantially parallel (inclined at, for example, about 10 to 15 minutes with respect to the horizontal axis), light incident upon the first compensation prism 13a is deviated from the horizontal direction by the same amount, but the light reflected by and emitted from the first compensation prism 13a, the compensation mirror 13b and the second compensation mirror 13c, is substantially collimated.

The focusing lens group 12 is provided with a rack 12a secured thereto, which is engaged by a pinion 12b. When a rotation of the pinion 12b takes place to move the focusing lens group 12 in the optical axis direction, the image of an object 9 formed by the objective lens group 11 and the focusing lens group 12 is translated along the optical axis. The operator views the object image formed on the focusing plate 14 together with the reticle etc., drawn on the focusing plate 14, through the eyepiece 15.

Figure 2:
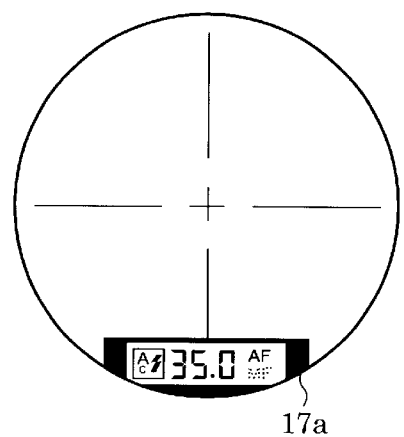
FIG. 2 is a view of an embodiment of the visual field according to the present invention.

There is an indicator 17 provided under the focusing plate 14. The embodiment shown in FIG. 2 is the indicator 17 which indicates not only the distance information to the object 9, but also whether or not the focusing is completed, and whether the current focusing state is in auto-mode (AF) or manual-mode (MF).

A beam splitter (half mirror) 16 is provided in the light path between the objective lens group 11 and the focusing plate 14 to split the light (or light path). A focus detecting system (focus detector) 20 is provided in the split light path to detect the focus state (state of the formed image) at an equivalent surface 14A which is optically equivalent to the focusing plate 14. The focusing lens 12 is driven by a lens driver (focusing lens group driving system) 30 in accordance with the output of the focus detector 20.

The focus detector 20 includes an AF sensor 21 located in the vicinity of the equivalent surface 14A, so that the defocus amount (defocus, front focus, rear focus) can be detected in accordance with the output of the AF sensor 21, of which structure is known per se. The AF sensor in the present embodiment is a phase matching type, in which the object image on the equivalent surface 14A is split by a condenser lens and a pair of separator lenses (image forming lenses) spaced at a distance identical to the base length, and is re-formed on a pair of CCD line sensors. The CCD line sensors are each provided with a number of photoelectric transducers which convert the object image received into electrical charges which are integrated (accumulated). The integrated charges are successively output as AF sensor data. The AF sensor data is amplified by a preamplifier 22 before being supplied to the calculation/control circuit 23. The calculation/control circuit 23 calculates the defocus amount through a predetermined defocus calculation in accordance with the AF sensor data. In the illustrated embodiment, in addition to the defocus amount, the displacement and direction of the movement of an AF motor 31 (the number of output pulses, referred to hereinafter as "AF pulses" of an encoder 33) necessary to move the focusing lens 12 until the defocus amount becomes zero is also calculated in accordance with the defocus amount. The number of AF pulses is set in an AF pulse counter 23a incorporated in the calculation/control circuit 23.

The calculation/control circuit 23 drives the AF motor 31 through an AF motor drive circuit 25, in accordance with the rotational direction of the AF motor 31, in order to be decrement the AF pulse counter 23a by detecting the output from the encoder 33. The rotation of the AF motor 31 is transmitted to the pinion 12b through a clutch-incorporated reduction mechanism 32 to move the rack 12a (namely, the focusing lens group 12). The calculation/control circuit 23 also controls the driving speed and stopping of the AF motor 31 based on the amount counted by the AF pulse counter 23a. Namely, when the counted amount is larger than a predetermined amount, the driving speed becomes high, and when the counted amount is smaller than the predetermined amount, the driving speed becomes low to allow braking, etc.

The calculation/control circuit 23 detects the defocus amount (i.e. detects focusing) against the object 9 by device of the focus detector 20 and the lens driver 30, in order to move the focusing lens group 12 in the optical axis direction. Accordingly, when the absolute amount of defocus is smaller than the predetermined amount, the lens driver 30 stops at that point, being determined as in-focus. Thus the focusing is essentially completed with respect to the object 9.

The focusing lens group 12 (rack 12a) is provided with a movement detector 19 to detect the moving amount of the focusing lens group 12 from an infinity focal position. The distance to the object 9 in a focused state is uniformly defined according to the focal lengths of the objective lens group 11 and the focusing lens group 12, the distance between the objective lens group 11 and the focusing plate 14, and the distance between the objective lens group 11 and the focusing lens group 12. Accordingly, when the moving amount of the focusing lens group 12 is detected by the movement detector 19, the distance to the object 9 may be obtained. Thus the calculation/control circuit 23 obtains the object distance based on the amount of movement of the focusing lens group 12 detected by the movement detector 19, and indicates the obtained object distance on the indicator 17.

The movement detector 19 may include, for example, a code-plate/brush mechanism known per se, to detect the absolute position of the focusing lens group 12. The movement detector 19 may also include, for example, an optical encoder which detects the relative position of the focusing lens group 12, namely the moving amount from the reference position (infinity focal position).

The focus detector 20 is provided with an AF start switch 27 to start the automatic focusing operation, a focusing operation knob 34 to change modes of focusing, and an AF switch 29 which detects the AF mode (that is, the mode which is not the manual focus mode).

The pinion 12b is driven in either a manual focus mode by the focusing operation knob 34, or in an autofocus mode, in which the automatic focusing operation is carried out in accordance with the focus detector 20 and the lens driver 30. Namely, the auto-level 10 is constructed such that the focusing mode is switched between the autofocus mode, in which the focusing lens group 12 is driven in accordance with the output of the focus detector 20, and the manual focus mode, in which the focusing lens group 12 is driven manually regardless of the output of the focus detector 20.

For instance, when the focusing operation knob 34, which constitutes a mode switching device between the manual focus mode and the autofocus mode, is moved in one axial direction, the manual mode is obtained, and when the focusing operation knob 34 is moved in another axial direction, an autofocus mode (AF mode) is obtained. For example, when the focusing operation knob 34 is switched to the manual focus mode, the clutch-incorporated reduction mechanism 32 disconnects the AF motor 31 from the reduction mechanism 32, and when the focusing operation knob 34 is switched to the autofocus mode, the clutch-incorporated reduction mechanism 32 clutches the AF motor 31 with the reduction mechanism 32. The clutch-incorporated reduction mechanism 32 may either be constructed so as to maintain connection with the focusing operation knob 34 at all times regardless of position (mode) of the focusing operation knob 34, or be constructed so as to disconnect from the focusing operation knob 34 when switched to the autofocus mode. The calculation/control circuit 23 detects whether the focusing operation knob 34 is switched to the autofocus mode when the AF switch 29 is turned OFF.

Figure 3:
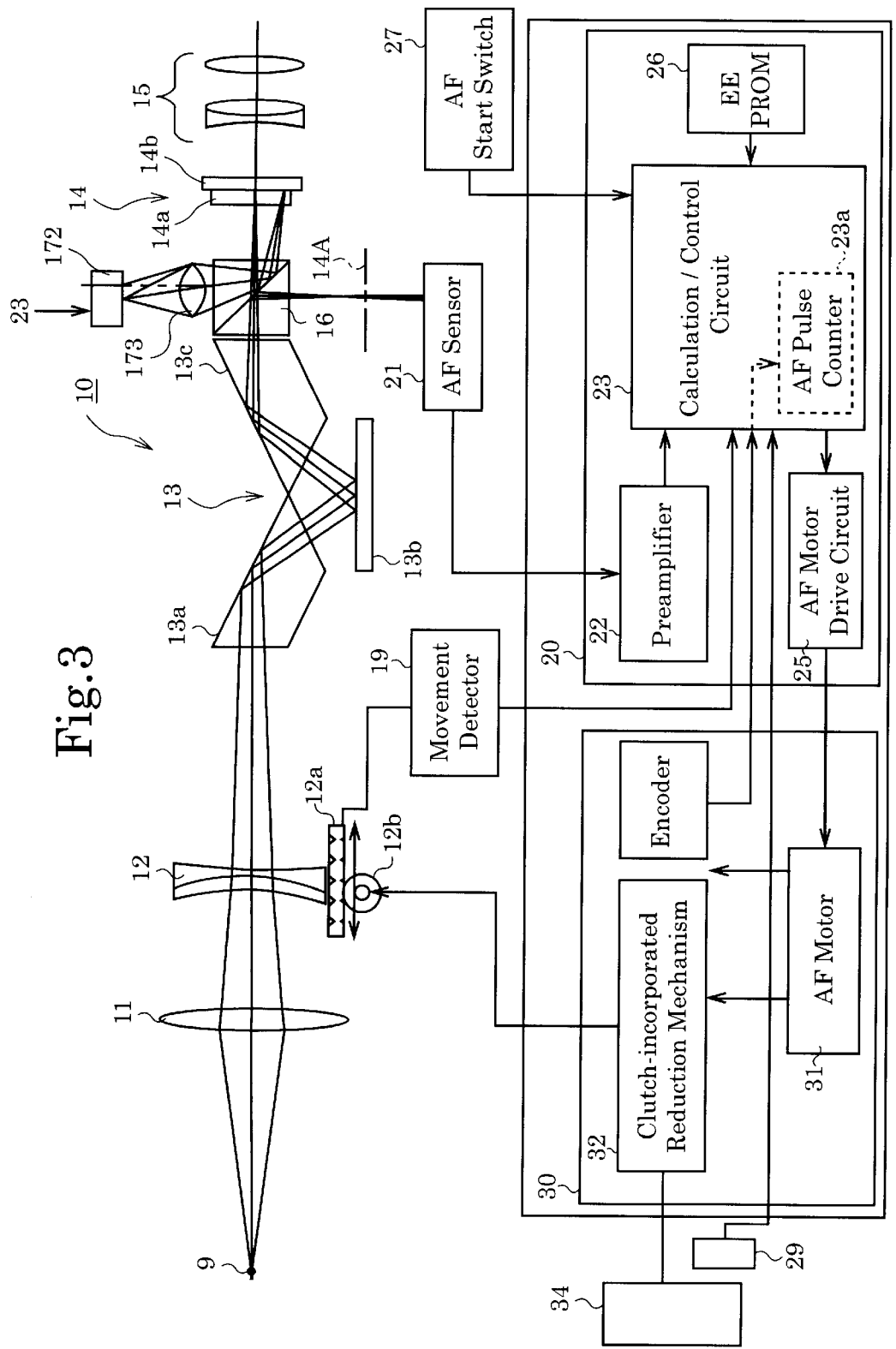
FIG. 3 is a block diagram of main elements of another aspect of an auto-level to which the present invention is applied.
Figure 5:
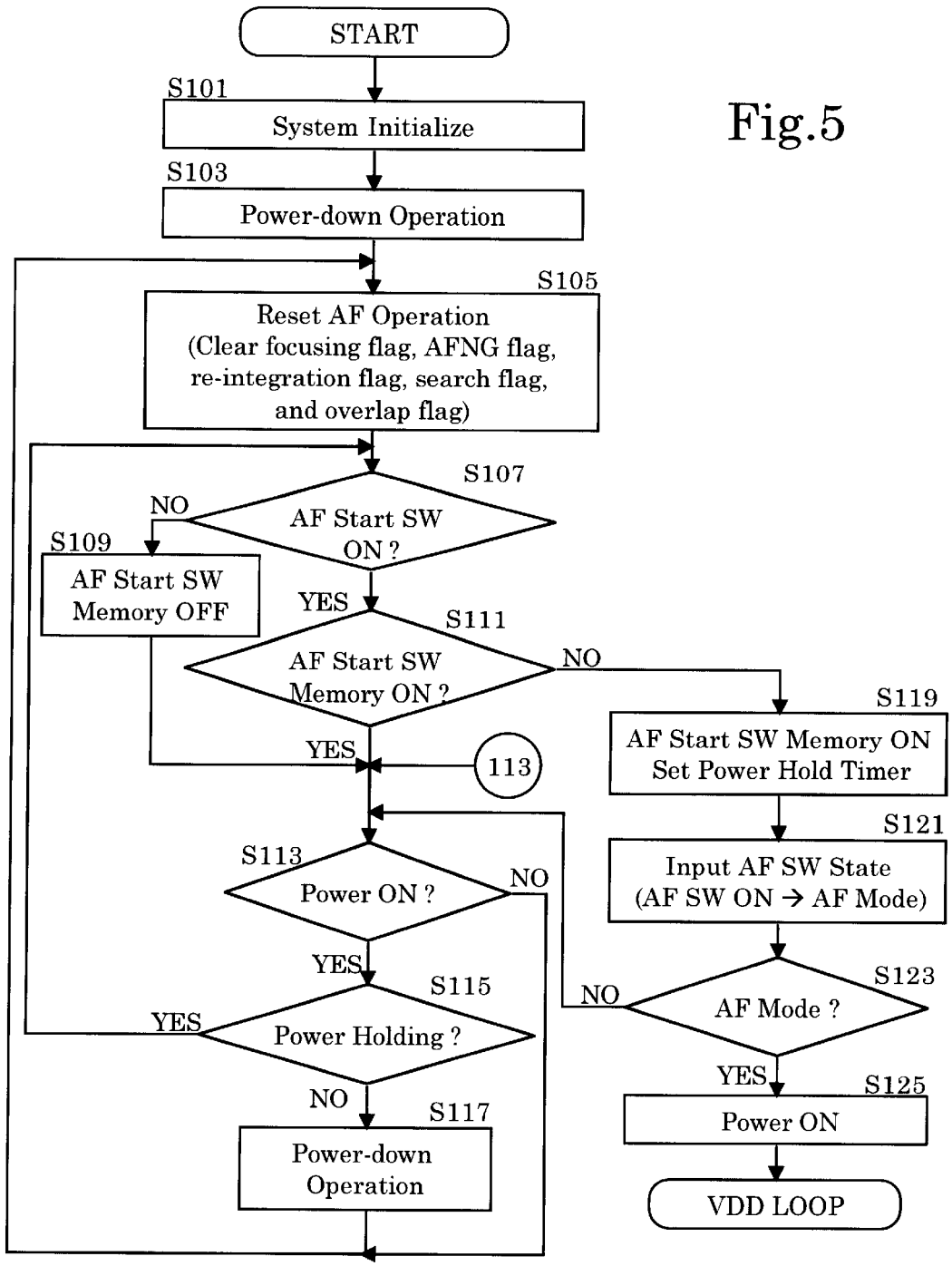
FIG. 5 is a flow chart showing a partial operation (START) in an automatic focusing operation of an auto-level according to the present invention.
Figure 6:
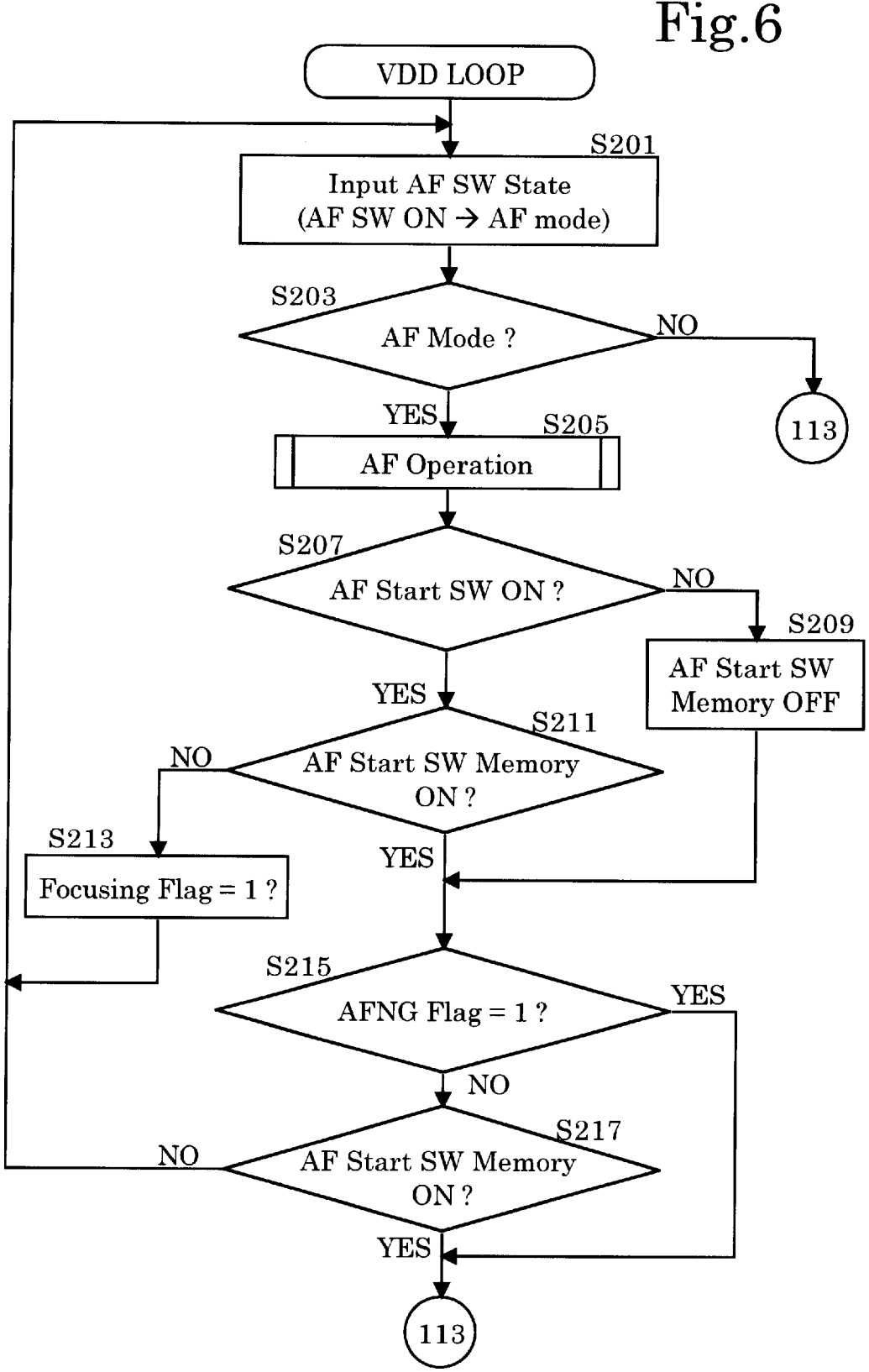
FIG. 6 is a flow chart showing a partial operation (VDD LOOP) in the automatic focusing operation of the auto-level according to the present invention.

FIG. 3 shows another aspect according to the embodiment of the present invention, wherein the auto-level 10 according to the embodiment of FIG. 1 has an indication projector 172 above the beam splitter 16, instead of the indicator 17, to project the indication data such as distance information. The indication light projected from the indication projector 172 is incident on the beam splitter 16 through a projection lens 173. The light is then reflected toward the focusing plate 14 at a surface of the beam splitter 16 on which the split light is reflected, so that the light may be incident on the lower portion of the focusing plate 14. Since the projection lens 173 is adjusted to be focused on the focusing plate 14, the lower portion of the focusing plate 14 indicates, the object distance, whether AF or MF, and whether focused or not focused, as shown in FIG. 2. The projection of the distance information by the indication projector 172 is controlled by the calculation/control circuit 23.

Figure 4:
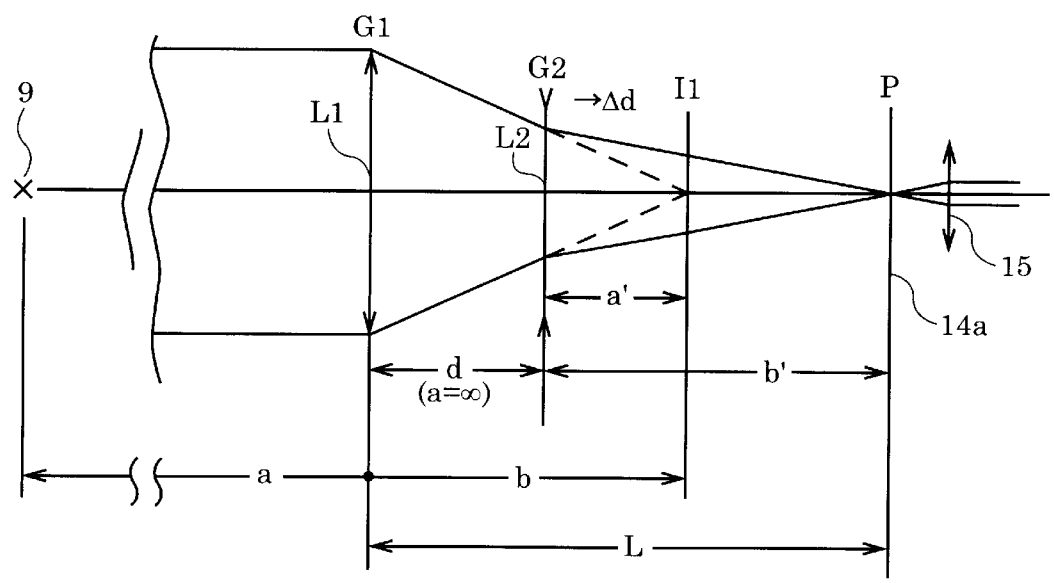
FIG. 4 is a view showing a mechanism of obtaining an object distance according to the embodiment of the present invention.

There is an example of operation for obtaining the object distance from the position of the focusing lens group 12 with reference to FIG. 4. The lens system is an inner focus lens which forms an image on a focusing surface P at a fixed position, by a fixed objective lens group L1 and a movable focusing lens group L2, likewise the case of the collimating telescope as shown in FIG. 1. Marks G1 and G2 respectively correspond to principal points of the objective lens group L1 and the focusing lens group L2.

The following formulas may be obtained wherein: f1 is the focal length of the objective lens group L1, f2 is the focal length of the focusing lens group L2, L is the distance from the principal point G1 (of the objective lens group L1) to the focusing surface p, a is the distance from the principal point G1 to the object 9 (hereinafter "object distance"), b is the distance from the principal point G1 to an image point I1 of the object 9 formed by the objective lens group L1, d is the distance between the principal points G1 and G2, a' is the distance from the principal point G2 (of the focusing lens group) to the focal point f1 of the objective lens group L1, and b' is the distance from the principal point G2 to the focusing surface p. In the following formulas, the focal lengths f1 and f2, and the distance L from the principal point G1 to the focusing surface p, are invariable values so long as the image optical system is an inner focus type, and the lens distance d+Δd is a variable number according to the object distance a.

The formula relating to imaging of the objective lens group:

$$1(-a)+1/b=1/f1 \tag{1}$$

The formula relating to imaging of the focusing lens group:

$$1(-a')+1/b'=1/f2 \tag{2}$$

Wherein the distance L is constant, provided that b' when a=∞ is bm', according to the formula (2), $$1/(-(f1-d))+1/bm'=1/f2$$

Therefore:

$$bm'=f2(f1-d)/(f1-d+f2) \tag{3}$$

In which, when the principal point G2 (of the focusing lens group L2) is moved by the amount of Δd, $$b'=bm'-\Delta d \tag{4}$$

The formula (2) may be modified as:

$$a'=f2\times b'/(f2-b) \tag{5}$$

Therefore, the distance d' between the principal points G1 and G2 can be obtained as follows:

$$d'=d+\Delta d \tag{6}$$

Therefore, the distance "b" to the image point I1 of the object 9 is obtained by:

$$b=d'+a' \tag{7}$$

The formula (1) may be modified as:

$$a=f1\times b/(f1-b) \tag{8}$$

In the above formulas, the focal lengths f1 and f2, the distances L from the principal point G1 to the focusing surface p, and the distance d between the lenses, are fixed. Therefore, when the moving amount of the lens Δd is measured, it is possible to obtain the object distance "a" by applying the formulas (3) through (8).

The above formulas relate to the operation to obtain the object distance for an inner focus telephotographic optical system. In the case of telephotographic system which moves the objective lens group as a whole, the object distance "a" may be obtained by:

$$1/f = 1/a + 1/b$$

wherein:

$$a = 1/(1/f'' 1/b).$$

The above formulas are the examples to obtain the object distance "a" by calculation. However, it is also possible to obtain the distance by reading the object distance data corresponding to table data. The table data is recorded in a memory (EEPROM 26) by calculating the relation between the object distance "a" and the moving amount Δd of the focusing lens group L2 in advance through calculation of every predetermined step of the focusing lens group L2. When the moving amount of focusing lens group L2 is detected, the object distance data can be read corresponding to the table data. Tables 1 and 2 show an example of the corresponding relation, in which, f1=90.162 (mm), f2=−52.165 (mm), d=55.452 (mm). In this case, if the object distance "a" corresponding to the moving amount of focusing lens group L2 which has not been processed as the table data is obtained by interpolation operation, a more accurate object distance "a" may be obtained.

TABLE 1

| Δd (Mm) | b' | a' | d' | b | a (mm) |
|---|---|---|---|---|---|
| 0.00 | 103.73 | 34.710 | 55.45 | 90.16 | −∞ |
| 0.10 | 103.63 | 34.699 | 55.55 | 90.25 | −91639 |
| 0.20 | 103.53 | 34.688 | 55.65 | 90.34 | −45868 |
| 0.30 | 103.43 | 34.676 | 55.75 | 90.43 | −30611 |
| 0.40 | 103.33 | 34.665 | 55.85 | 90.52 | −22983 |
| 0.50 | 103.23 | 34.654 | 55.95 | 90.61 | −18406 |
| 0.60 | 103.13 | 34.643 | 56.05 | 90.69 | −15354 |
| 0.70 | 103.03 | 34.631 | 56.15 | 90.78 | −13175 |
| 0.80 | 102.93 | 34.620 | 56.25 | 90.87 | −11540 |
| 0.90 | 102.83 | 34.609 | 56.35 | 90.96 | −10269 |
| 1.00 | 102.73 | 34.597 | 56.45 | 91.05 | −9252 |
| 1.10 | 102.63 | 34.586 | 56.55 | 91.14 | −8420 |
| 1.20 | 102.53 | 34.575 | 56.65 | 91.23 | −7726 |
| 1.30 | 102.43 | 34.563 | 56.75 | 91.32 | −7139 |
| 1.40 | 102.33 | 34.552 | 56.85 | 91.40 | −6636 |
| 1.50 | 102.23 | 34.540 | 56.95 | 91.49 | −6200 |
| 1.60 | 102.13 | 34.529 | 57.05 | 91.58 | −5819 |
| 1.70 | 102.03 | 34.518 | 57.15 | 91.67 | −5482 |
| 1.80 | 101.93 | 34.506 | 57.25 | 91.76 | −5183 |
| 1.90 | 101.83 | 34.495 | 57.35 | 91.85 | −4916 |
| 2.00 | 101.73 | 34.483 | 57.45 | 91.94 | −4675 |
| 2.10 | 101.63 | 34.472 | 57.55 | 92.02 | −4457 |
| 2.20 | 101.53 | 34.460 | 57.65 | 92.11 | −4259 |
| 2.30 | 101.43 | 34.449 | 57.75 | 92.20 | −4078 |
| 2.40 | 101.33 | 34.437 | 57.85 | 92.29 | −3912 |
| 2.50 | 101.23 | 34.426 | 57.95 | 92.38 | −3759 |
| 2.60 | 101.13 | 34.414 | 58.05 | 92.47 | −3619 |
| 2.70 | 101.03 | 34.402 | 58.15 | 92.55 | −3488 |
| 2.80 | 100.93 | 34.391 | 58.25 | 92.64 | −3367 |
| 2.90 | 100.83 | 34.379 | 58.35 | 92.73 | −3254 |
| 3.00 | 100.73 | 34.368 | 58.45 | 92.82 | −3149 |

TABLE 2

| ΔD (mm) | b' | a' | d' | b | a (mm) |
|---|---|---|---|---|---|
| 0.094 | 103.64 | 34.699 | 55.55 | 90.25 | −97482 |
| 0.098 | 103.63 | 34.699 | 55.55 | 90.25 | −93507 |
| 0.100 | 103.63 | 34.699 | 55.55 | 90.25 | −91639 |
| 0.102 | 103.63 | 34.699 | 55.55 | 90.25 | −89844 |
| 0.106 | 103.63 | 34.698 | 55.56 | 90.26 | −86457 |
| 0.194 | 103.54 | 34.688 | 55.65 | 90.33 | −47284 |
| 0.198 | 103.53 | 34.688 | 55.65 | 90.34 | −46331 |
| 0.200 | 103.53 | 34.688 | 55.65 | 90.34 | −45868 |
| 0.202 | 103.53 | 34.687 | 55.65 | 90.34 | −45415 |
| 0.206 | 103.53 | 34.687 | 55.66 | 90.34 | −44535 |
| 0.494 | 103.24 | 34.655 | 55.95 | 90.60 | −18628 |
| 0.498 | 103.23 | 34.654 | 55.95 | 90.60 | −18479 |
| 0.500 | 103.23 | 34.654 | 55.95 | 90.61 | −18406 |
| 0.502 | 103.23 | 34.654 | 55.95 | 90.61 | −18333 |
| 0.506 | 103.23 | 34.653 | 55.96 | 90.61 | −18189 |
| 0.919 | 102.81 | 34.606 | 56.37 | 90.98 | −10059 |
| 0.923 | 102.81 | 34.606 | 56.38 | 90.98 | −10015 |
| 0.925 | 102.81 | 34.606 | 56.38 | 90.98 | −9994 |
| 0.927 | 102.81 | 34.606 | 56.38 | 90.98 | −9973 |
| 0.931 | 102.80 | 34.605 | 56.38 | 90.99 | −9930 |

The automatic focusing operation of the auto-level 10 is discussed below with reference to the flow charts shown in FIGS. 5 through 11 In the present embodiment, the object distance is indicated on the indicator 17 or by the indication projector 172 by detecting the moving amount of the focusing lens group 12 at predetermined intervals when the AF start switch 27 is turned ON, regardless of the automatic focusing operation mode (AF mode) or the manual focusing operation mode (MF mode).

The following flow charts are executed by the calculation/control circuit 23 in a state that an unillustrated battery is loaded in the auto-level 10.

When the battery (not illustrated) is loaded, an internal RAM and input/output ports, are firstly initialized at step S101 to subsequently enter the power-down operation at step S103. Thereafter, no operation at steps S101 and S103 are performed unless the battery is unloaded and is then reloaded.

The power-down operation corresponds to a stand-by operation in which the power source is OFF (except to calculation/control circuit 23 and the movement detector 19) while the AF start switch 27 is OFF to wait for the operation of the AF start switch 27. If the AF start switch 27 is turned ON, the power source is turned ON to perform the AF operation (automatic focusing operation).

When the power-down operation is completed, flags for the AF operation are reset at step S105. In the illustrated embodiment, there are several kinds of flags to be reset, including a focusing flag which represents that a focused state is obtained, an AFNG flag which represents that the automatic focusing operation cannot be carried out, a re-integration flag which represents that the integration operation is performed after the focused state has been obtained, and a search/overlap flag which is adapted to discriminate that the integral operation is performed during movement of the focusing lens 12.

If the reset operation for the AF operation is completed, a check is made to determine whether the AF start switch 27 is turned ON (step S107). Since the AF start switch 27 is OFF at the initial position in which no operation by the operator occurs, the "OFF" data is written in the AF start switch memory (steps S107, NO; S109). Thereafter, a check is made to determine whether the power source is ON at step S113. Since the power source is OFF at the initial position in which no power is supplied to each circuit (step S113: NO), the control is returned to step S105 and the operations at steps S107, S109 and S113 are repeated.

If the AF start switch 27 is turned ON at step S107, the control proceeds to step S111 to check whether the AF start switch memory is ON. When the AF start switch memory is OFF (the AF start switch memory is OFF at the first time), the control proceeds to step S119 to write "ON" data in the AF start switch memory, and to start a power hold timer (steps S111, NO; S119). Thereafter, if the AF switch 29 is turned ON (in the AF mode), the power source is turned ON to supply power to the circuits in order to perform the VDD loop operation (steps S121; S123, YES; S125). If the AF switch 29 is OFF, which corresponds to the manual focusing mode, the control is returned to step S113 (S123, NO; S113).

Even in the manual mode, the power source is turned ON by turning the AF start switch 27 ON, thereby the power is supplied to each circuit until the time of the power hold timer is up. Thus the distance is displayed on the indicator 17 or by the indication projector 172.

In the VDD loop operation, the automatic focusing operation is carried out to obtain a focused state while detecting the state of the AF start switch 27, and if the focused state cannot be obtained, the control is returned to step S113.

When the control enters the VDD loop operation, the state of the AF switch 29 is input again (step S201), and the control will be able to proceed provided that the AF switch 29 is ON. If the AF switch 29 is OFF, which corresponds to the manual focus mode, the control is returned to the power-down operation (steps S201; S203, NO; S113). The following discussion will be given on the assumption that the AF switch 29 is ON.

If the AF switch 29 is ON, the AF operation is performed to detect the defocus amount and accordingly move the focusing lens group 12 to a focal position (steps S203, YES; S205). While the AF start switch 27 is maintained ON, a check is made to determine whether the AF start switch memory is ON at step S211. Since the AF start switch memory has been ON at step S119, the focusing flag and the AFNG flag are checked (steps S207, YES; S211, YES; S215; S217) Since the focusing flag and the AFNG flag are both cleared if no focused state nor the impossibility of the focusing operation are detected during the AF operation, the control is returned to step S201 (steps S215, NO; S217, NO; S201). The operations at steps S201, S203, S205, S207, S211, S215, and S217 are repeated until either the focused state is obtained and the focusing flag is set to "1", or the focused state cannot be obtained and the AFNG flag is set to "1".

The focusing lens group 12 has been moved to the focal position during the AF operation at step S205, and when the focusing flag is set to "1", the control is returned to the power-down operation (steps S215, YES; S113). If focusing cannot be effected for some reason, for example, when the aiming object moves or is too dark or is too low in contrast, the AFNG flag is set to "1" to return the control to the power-down operation at step S113 (steps S217: YES, S113).

When the AF start switch 27 is turned OFF during the VDD loop operation, the control proceeds from step S207 to step S209 to write "OFF" in the AF start switch memory. The control then proceeds to step S215 by jumping step S211 (steps S207: YES, S209, S215).

Further, when the AF switch 29 is turned OFF during the VDD loop operation, that is, when the focusing operation knob 34 is switched to the manual focus position, the control is returned from step S203 to step S113 to end the AF operation (steps S203, NO; S113).

When the control is returned to the power-down operation (step S113), a check is made to determine whether the power source is turned ON at step S113. When the power source is OFF, the control is returned to the step S105. When the power source is ON and the power hold state is maintained, the control is returned to step S107 (steps S113, YES; S115, YES; S107). When the power hold state is released, the control is returned to step S105 by executing the power-down operation (steps S115, NO; S117; S105). The term "maintaining" of the power hold means that the power hold timer has not lapsed.

Figure 7:
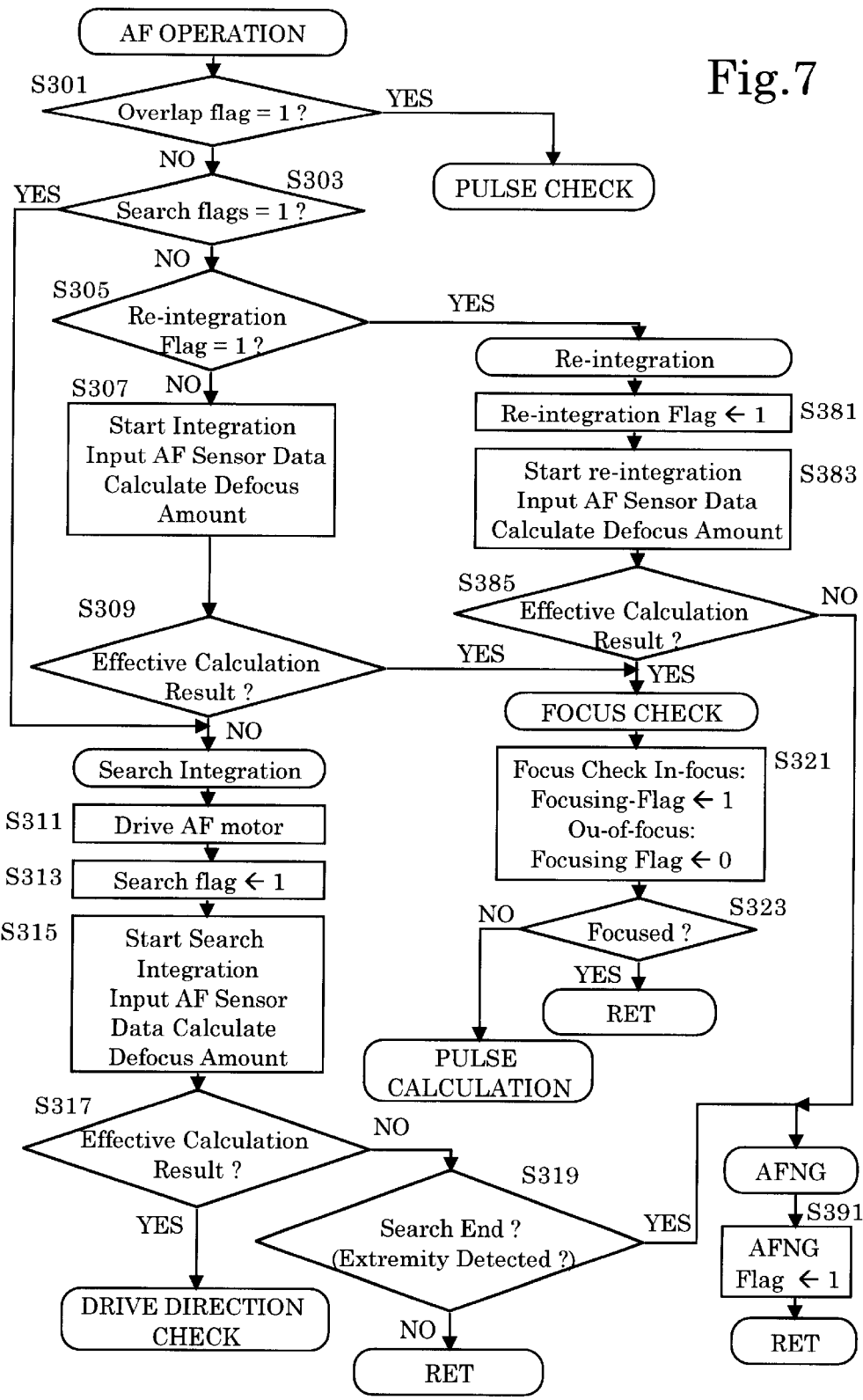
FIG. 7 is a flow chart showing a partial operation (AF OPERATION) in the automatic focusing operation of the auto-level according to the present invention.

The AF operation at step S205 will be described below in detail with reference to the flow charts shown in FIGS. 7 through 9. When the control enters the AF operation, the overlap flag, the search flag and the re-integration flag are checked (steps S301, S303, S305). Since all the flags have been cleared at step S105 at the first step, the AF sensor executes the integration and the integration result is input as AF sensor data to calculate the defocus amount (steps S301, NO; S303, NO; S305, NO; S307). As is well known, in the calculation of the defocus amount, a correlation ratio of the data of a pair of AF sensors is obtained, so that the direction of defocus (front focus or rear focus) and the defocus amount can be obtained in accordance with the correlation ratio.

A check is made to determine whether the calculated result is effective at step S309. If the contrast of the aiming object is too low, or the aiming object is a repetitive pattern, or the object brightness is too low, there is a possibility that the calculation result is ineffective. An effective calculation result is usually obtained, and hence the effective calculation result will be discussed below first.

If the calculation result is effective, the focus check operation is performed. If a focused state is obtained, the focus flag is set to "1". If a focused state is not obtained, i.e., an out-of-focus state, the focus flag is set to "0" (steps S309, YES; S321). In the illustrated embodiment, when the defocus amount is within a predetermined limit or allowance, it is considered that a focused state is obtained. If the focused state is obtained at step S323, the control is returned to the VDD loop operation to perform the operations at step S207 and steps subsequent thereto (step S323, YES). In the case of an out-of-focus state, the control proceeds to the pulse calculation operation (step S323, NO).

Figure 8:
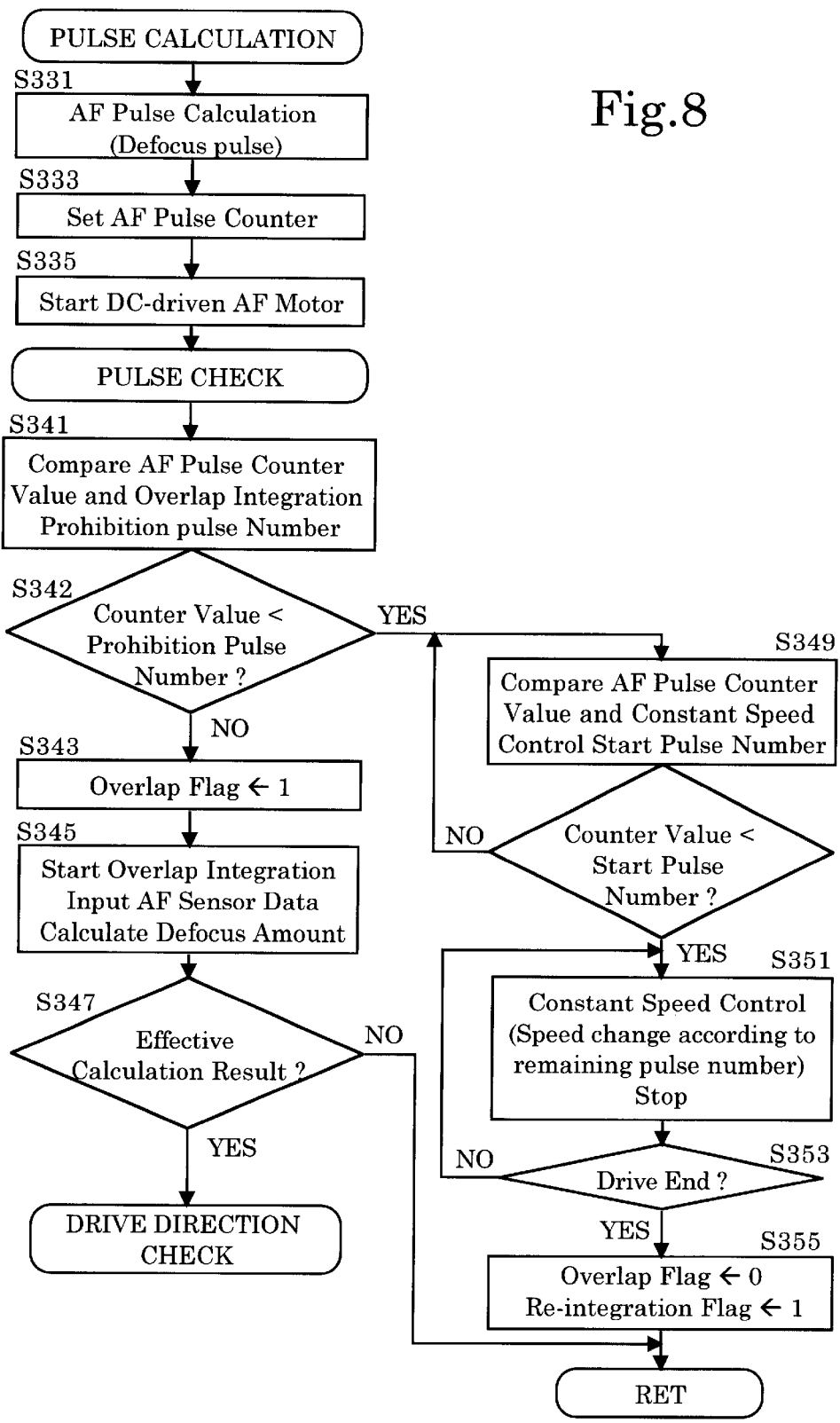
FIG. 8 is a flow chart showing a partial operation (PULSE CALCULATION) in the automatic focusing operation of the auto-level according to the present invention.

In the pulse calculation operation as shown in FIG. 8, the number of AF pulses are calculated based on the effective defocus amount. In other words, the amount of drive of the AF motor 31 (the number of AF pulses supplied from the encoder 33) necessary to move the focusing lens group 12 until the defocus amount is zero is attained.

When the control enters the AF pulse calculation operation, the drive direction of the AF motor 31 and the number of AF pulses are calculated in accordance with the defocus amount (step S331). The obtained AF pulse number is set in the AF pulse counter 23a and the AF motor 31 is DC-driven and the pulse checking is carried out (steps S333, S335). The value of the AF pulse counter 23a is decreased by one every time one AF pulse is output from the encoder 33.

In the pulse check operation, the drive speed of the AF motor 31 is controlled in accordance with the value of the AF pulse counter 23a. Namely, when the counted number is larger than the overlap-integration-prohibition-pulse-number, the AF motor 31 is driven at a high speed to move the focusing lens 12 toward the focal position within a short space of time and the overlap integration is also effected. When the counted number is smaller than the overlap-integration-prohibition-pulse-number, although the AF motor 31 is still driven at high speed, the overlap integration is prohibited. If the counted number is smaller than a constant speed control start pulse number, the AF motor 31 is driven under PWM (Pulse Width Modulation) at low speed to prevent the focusing lens group 12 from moving beyond the focal position. When the counted number is zero, the AF motor 31 is stopped.

When the control enters the pulse check operation, the value of the AF pulse counter 23a is compared with the overlap-integration-prohibition-pulse-number (step S341). If the counter value is larger than the overlap-integration-prohibition-pulse-number, the control proceeds to step S343 in which the overlap flag is set to "1". Thereafter, the overlap integration begins, and the AF sensor data is input from the AF sensor 21 to perform the amount-of-defocus calculation (steps S341, NO; S343; S345). If an effective calculation result is obtained, the control proceeds to the drive direction check operation (step S347: YES), and if no effective calculation result is obtained, the control is returned (step S347, NO).

Figure 9:
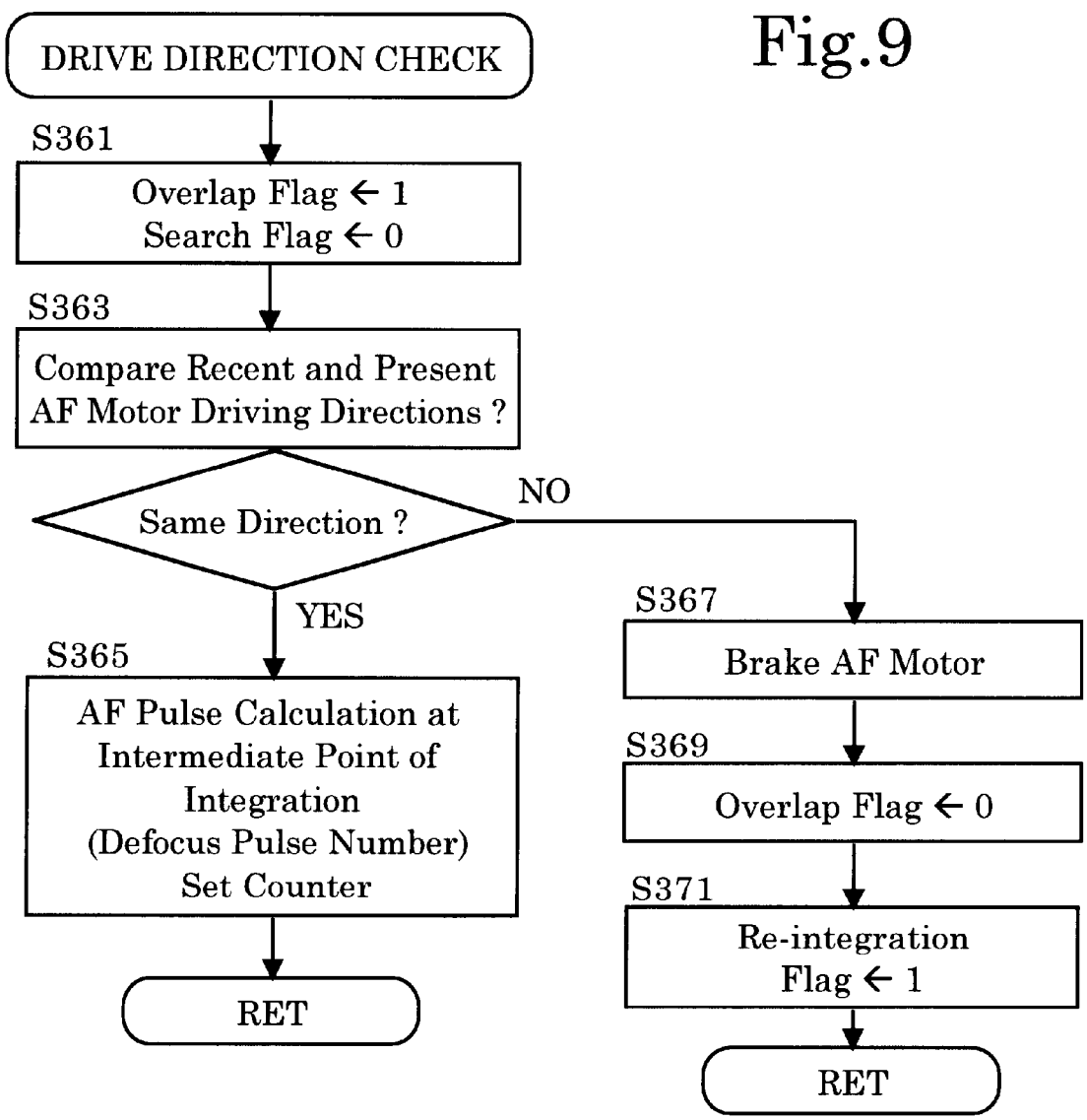
FIG. 9 is a flow chart showing a partial operation (DRIVE DIRECTION CHECK) in the automatic focusing operation of the auto-level according to the present invention.

In the drive direction check operation as shown in FIG. 9, the AF pulse number is calculated and set in the counter, based on the AF sensor data obtained by the integration during driving of the AF motor 31. If the drive direction changes, the AF motor 31 is braked and stopped. In the illustrated embodiment, the AF motor 31 is braked by the short-circuiting of the AF motor 31 at opposite electrodes thereof.

When the control enters the drive direction check operation, the overlap flag is set to "1", and the search flag is set to "0" (step S361). Thereafter, the previous and present drive directions of the focusing lens group 12 are compared in accordance with the calculation result (step S363). When the directions are identical with each other, the AF pulse number is calculated at an intermediate point of the integration, so that the calculated value is set by the counter (steps S363, YES; S365). Subsequently, the control is returned. If the drive direction changes, the AF motor 31 is braked and stopped. Consequently, the overlap flag is set to "0" and the re-integration flag is set to "1". Thereafter, the control is returned to the VDD loop operation (steps S363, NO; S367; S369; S371).

When the control is returned to the VDD loop operation, the operations at step S207 and steps subsequent thereto are carried out, and the control enters the AF operation again. If no change in the drive direction occurs, the control proceeds to the pulse check operation from step S301 since the overlap flag is set to "1". The operations from step S341 to step S347 and the operations of the drive direction check operation from step S361 to step S365 are carried out and the control is returned to step S205 for the pulse check operation. These operations are repeated until the counter value is smaller than the overlap-integration-prohibition- pulse-number.

In the above mentioned AF operation, usually the AF pulse number necessary to move the focusing lens group 12 to the focal position is decreased and becomes smaller than the overlap-integration-prohibition-pulse-number. Thus, the control proceeds from step S341 to step S349 of the pulse check operation.

The operations from step S349 to step S355 stop the AF motor 31 upon completion of driving of the AF motor corresponding to the calculated AF pulse number. At step S349, control does not proceed until the AF pulse number is smaller than the constant speed control start pulse number. If the AF pulse number is smaller than the constant speed control start pulse number, the AF motor 31 is driven at a low speed in accordance with the remaining AF pulse number. When the AF pulse number is zero, the AF motor 31 is stopped (steps S349, YES; S351; S353, NO). When the AF motor 31 is stopped, the overlap flag is set to "0", and the re-integration flag is set to "1" (steps S353, YES; S355). Thereafter, the control is returned to the VDD loop operation.

If the control proceeds to step S205 of the VDD loop operation, the control then enters the re-integration operation at step S305, since the overlap flag and the search flag are set to "0" and the re-integration flag is set to "1". The same is true when the drive direction changes at step S363.

In the re-integration operation, the defocus amount is calculated and whether or not the telescope is focused is checked in accordance with the defocus amount thus obtained. If a focused state is obtained, the focusing flag is set to "1", and if a focused state is not obtained, the AF pulse is calculated again to move the focusing lens group 12.

If the control is returned to the VDD loop operation when the focusing flag is set to "1", the control proceeds to the power-down operation from step S215. Thus, the AF operation ends and the control waits for the operation of the AF start switch 27.

The above describes the control when the focused state is correctly obtained. In the case that it is difficult or impossible to obtain a focused state for some reason, the control enters the VDD loop operation and is returned to the power-down operation in an out-of-focus state. This will be discussed below.

In the first AF operation, the integration starts, the AF sensor data is input, and the defocus amount is calculated at step S307 (steps S301, NO; S303, NO; S305, NO; S307). If it is impossible to calculate the effective defocus amount for some reason, for example, when the object contrast is too low, the control proceeds to the search integration operation from step S309 (steps S309, NO; S311).

In the search integration operation, the integration and the defocus calculation are carried out to obtain an effective defocus amount while driving the AF motor 31 from a close focal position to an infinity focal position. If no effective defocus amount is obtained even by the search integration operation, the AFNG flag is set to "1" and the control is returned and enters the power-down operation at step S217.

When the control enters the search integration operation (search operation), the AF motor 31 is firstly search-driven (in the direction of the close focal position) and the search flag is set to "1" to commence the integration by the AF sensor 21. When the integration is completed, the integral value is input as the AF sensor data to calculate the defocus amount by defocus calculation (steps S311, S313, S315). If the effective defocus amount is obtained, the control proceeds to the drive direction checking operation (step S317, YES). If no effective defocus amount is obtained, the control is returned to the VDD loop operation to perform the operations at step S207 and steps subsequent thereto (steps S317, NO; S319).

The AF motor search-driving operation refers to an operation in which the AF motor 31 is first driven in the direction of the close focal position and when the focusing lens 12 reaches and stops at a movement extremity on the close distance side, the AF motor 31 is driven in the reverse direction, i.e., in the direction of the infinity focal position. When the focusing lens group 12 reaches and stops at a movement extremity on the infinity side, the AF motor 31 is stopped. If an effective calculation result is obtained during the search driving, the AF motor is driven in accordance with the effective value of the defocus amount.

When the control enters the operation at step S205 of the VDD loop operation, the overlap flag is cleared. Since the search flag is set to "1", the control enters the search integration operation at step S303 and the search integration operations at step S313 and steps subsequent thereto are carried out. If no effective calculation result is obtained when the focusing lens group 12 reaches the infinity focal position, the control enters the AFNG operation, in which the AFNG flag is set to "1". Thereafter, the control is returned to the VDD loop operation and enters the power-down operation at step S217 (steps S317, NO; S319, YES; S391).

The above discussion has been directed to the case when no effective calculation result is obtained from the beginning. Once an effective calculation result is obtained, thereby the focusing lens group 12 is moved but still no focused state is obtained, if no effective calculation result is obtained by the re-integration operation (steps S381; S383), the control proceeds to the AFNG operation from step S385. The AFNG flag is set to "1" in the AFNG operation and thereafter, the control is returned to the VDD loop operation and enters the power-down operation at step S217 (S385, NO; S391).

Figure 10:
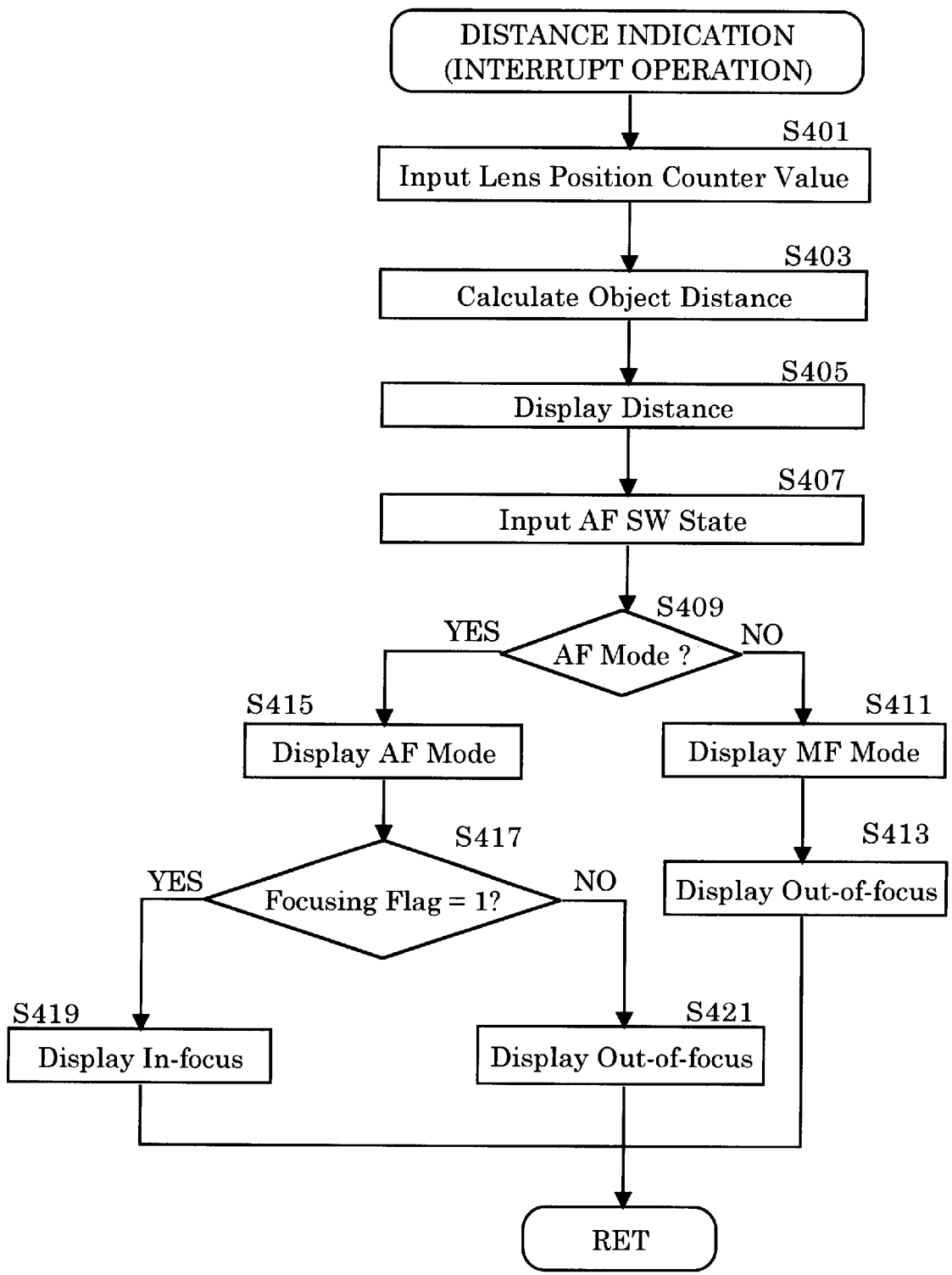
FIG. 10 is a flow chart showing a distance indication operation of the auto-level according to the present invention.

The interrupt operation, whereby the calculation/control circuit 23 interrupts at regular intervals via a hard timer during executing the above operations, will now be described with reference to FIG. 10. Firstly, the moving amount data from the reference position of the focusing lens group 12 detected by the movement detector 19 (counter value) are input at step S401. The amount-of-movement data is represented by Δd. The object distance "a" is obtained by calculation based on the amount-of-movement data (step S403). The obtained object distance is displayed on the indicator 17 (step S405).

The state of the AF switch 29 is input at step S407. If the AF switch 29 is OFF, namely the present state is not the AF mode, the manual focus mode as well as the out-of-focus state are displayed (steps S407; S409, NO; S411; S413). Then the control is returned. If the AF switch 29 is ON, namely the present state is the AF mode, the AF mode is displayed (steps S407; S409, YES; S415). Thereafter, the focusing flag is checked. If the focusing flag has been set to "1", the focused state is displayed (steps S417, YES; S419). Conversely, if the focusing flag has been set to "0", the out-of-focus state is displayed (steps S417, NO; S421).

The above interrupt operation may display the object distance currently focused, on the display 17a in the visual field of the indicator 17, both in the autofocus mode and the manual focus mode.

As the operator has power of analysis and focus recognition ability via his/her eye(s), when he/she observes an object through the collimating telescope of the auto-level 10 wherein a little defocus amount exists, he/she may feel that the image is focused even though the telescope is not actually in the focused state. Accordingly, even if accurate focusing is not actually carried out, as long as the defocus amount is insignificant enough such that the operator feels the image is focused, the focusing operation in the automatic focusing is considered as being in a focused state. Thus the time required for focusing can be reduced, and "hunting" of the telescope can be prevented.

However, it is true that the error of the object distance will become larger when the object distance is obtained based on the position of the focusing lens group 12 in which, as discussed above, a little amount of defocus exists.

Therefore, according to a second embodiment of the present invention, an amount-of-defocus to be considered as being focused in the automatic focusing operation is set within a predetermined amount, and the object distance may be obtained with reference to the amount-of-defocus.

Figure 11:
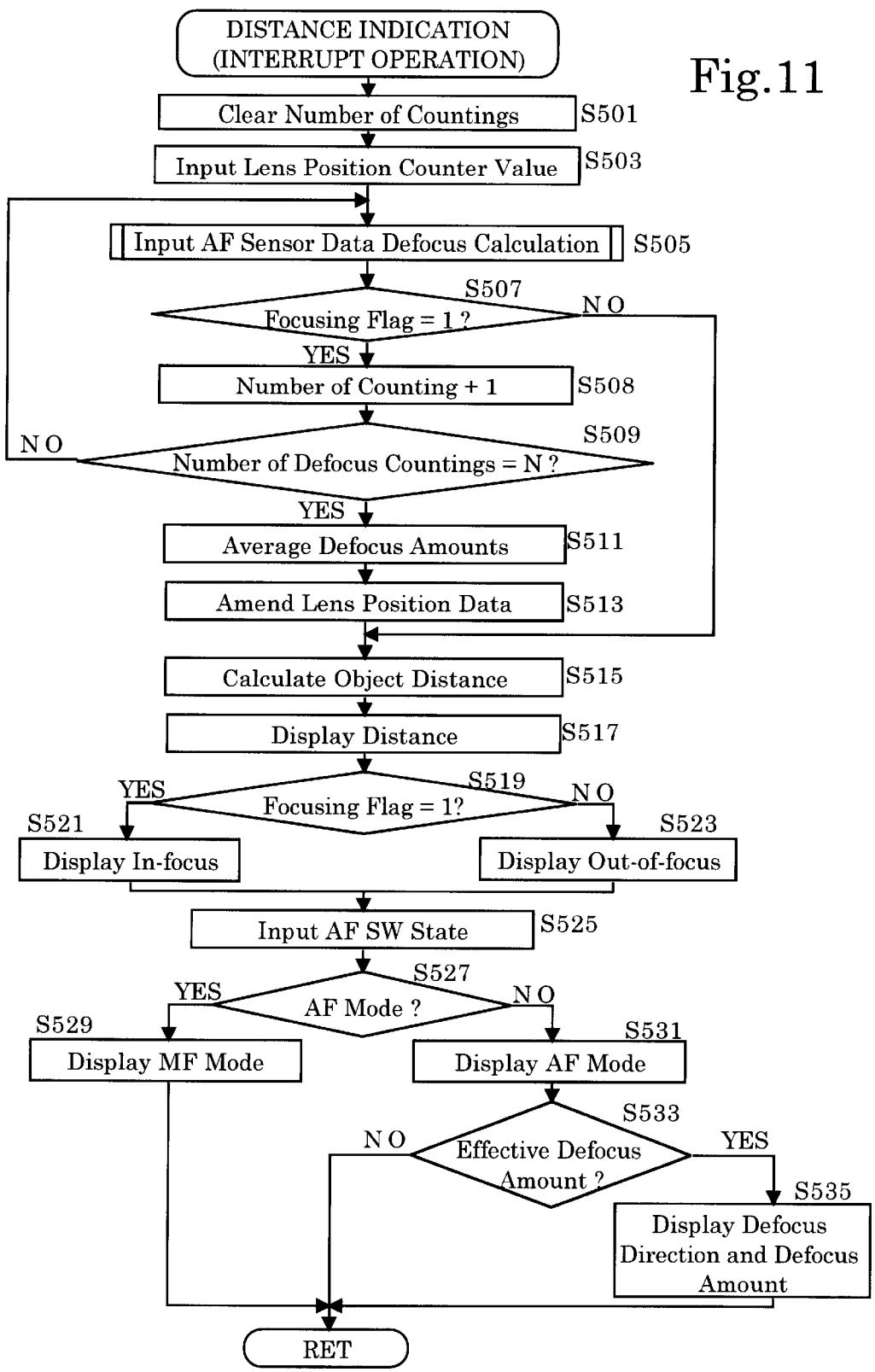
FIG. 11 is a flow chart showing the other distance indication operation of the auto-level according to the present invention.

FIG. 11 shows the second embodiment of the present invention, which is illustrated by a flow chart of the distance indication operation. This distance indication is actuated according to the forced interruption at regular intervals by a timer, similar to the distance indication operation shown in FIG. 10.

When the control enters this distance indication operation, the number of calculations is firstly cleared at step S501. The number of calculations relates to a counter which counts and controls the number of calculations of the defocus amount. The lens position counter value is then input from the movement detector 19, and the AF sensor data is also input to calculate the defocus amount (steps S503, S505).

Thereafter, the focusing flag is checked. If the focusing flag has been set to "1", the number of 1 is added to the number of calculations, and when the present value of the number of calculations is not N, the control is returned to step S505 (steps S507, YES; S508; S509, NO; S505). Accordingly, when the focused state is obtained, the calculations of the defocus amount are repeated several times to improve accuracy of calculation of the defocus amount. When the defocus amounts are calculated N times, the average of the calculated defocus amounts is obtained, and the lens position data is amended, then the control proceeds to step S515 (steps S509, YES; S511; S513; S515). If the telescope is in an out-of-focus state, the control jumps from step S507 to step S515 (steps S507, NO; S515).

The object distance "a" is calculated at step S515 based on the lens position counter value and the lens position amended data. The calculated object distance "a" is then displayed in a visual field of the indicator 17 or by the indication projector 172 (step S517).

Thereafter, the focusing flag is checked. In the focused state, the focused state is displayed (steps S519, YES; S521), and in the out-of-focus state, the out-of-focus state is displayed (steps S519, NO; S523). Then the state of the AF switch 29 is input at step S525. In the AF mode (AF switch 29 is ON), the AF mode is displayed and the control is returned (steps S527, YES; S529). In the manual focus mode, namely not in the AF mode (AF switch 29 is OFF), the MF mode is displayed (steps S527, NO; S531). In the MF mode, if the defocus amount is effective, the defocus direction and the defocus amount are displayed, and the control is returned (steps S533, YES; S535). If the defocus amount is not effective, the control is returned by jumping step S535 (step S533, NO).

According to the second embodiment of the present invention, the object distance is displayed by not only using the position of the focusing lens group 12, but also using the defocus amount detected by the AF sensor 21, thus an accurate object distance may be detected and displayed.

In addition, according to an aspect of the present embodiment, the defocus direction and the defocus amount are displayed, it is possible to confirm whether the accurate focused state is obtained, and in the case of an out-of-focus state, it is possible to confirm whether the present state is front focus or rear focus, as well as the amount of error thereof.

Although the distance information is displayed in the visual field according to the above embodiments as above illustrated, the display is not limited to be positioned in the visual field, and may be positioned outside the optical instrument. In addition, although the above embodiments are applied to an auto-level, the present invention can be equally applied to other surveying instruments, such as a transit or a total station, as well as a telescopic optical system such as a telescope or a binocular telescope, etc.

As may be understood from the foregoing, according to the present invention, the object distance is indicated in the visual field of observation, by obtaining the object distance from the position of the focusing lens group, in regard to the optical instrument in which the focusing is carried out by moving the focusing lens group. Thus the operator can easily confirm the object distance during observing the object.

Further, according to the present invention, there is a device to detect the defocus amount, and the position of the focusing lens group is amended according to the defocus amount detected by the defocus amount detecting device. Thus an accurate object distance can be detected.

What is claimed is:

1. An optical surveying instrument indicator, said instrument including an observational optical system to observe an image of an object, the image formed by an objective optical system having a focusing lens group, said indicator comprising:

a beam splitting optical system fixedly positioned between the objective optical system and the observational optical system, a light beam from the object being transmitted through said beam splitting optical system passing through the observational optical system, a lens position detecting device that detects a position of said focusing lens group and that outputs a lens position value;

a focus detection device that detects an amount of defocus of said focusing lens group;

a distance detecting device that obtains an object distance;

a display device that displays, within a visual field of said observational optical system, an object distance detected by said distance detecting device; and the object distance displayed by said display device being obtained based upon said detected position of said focusing lens group based upon the amount of defocus detected by said focus detection device and upon the lens position value.

2. The optical surveying instrument indicator according to claim 1, wherein said optical surveying instrument is a telescope comprising, in order from the object side, a fixed objective lens group, a movable focusing lens group, an erecting optical system and an eyepiece lens group.

3. The optical surveying instrument indicator according to claim 1, wherein said optical surveying instrument is a collimating telescope of an auto-level comprising, in order from the object side, a fixed objective lens group, a movable focusing lens group, a horizontal compensation optical system, a focusing plate and an eyepiece lens group.

4. The optical surveying instrument indicator according to claim 3, wherein a display of said display device is provided in the periphery of said focusing plate.

5. The optical surveying instrument indicator according to claim 4, wherein said optical instrument further comprises:

a split optical system between said horizontal compensation optical system and said focusing plate;

an AF sensor unit to detect a focusing state by receiving light divided by reflection in said split optical system; and a lens driving device to move said focusing lens group according to a focusing state detected by said AF sensor unit.

6. The optical surveying instrument indicator according to claim 5, wherein said display device further comprises a projection optical system, which emits information of said object distance on said split optical system, to project said information of said object distance on the periphery of said focusing plate through reflection by said split optical system.

7. The optical surveying instrument indicator according to claim 5, wherein said optical instrument further comprises a manual focusing operation device which manually moves said focusing lens group.

8. The optical surveying instrument indicator according to claim 7, wherein said distance detecting device displays by said display device through detecting said object distance when any operation to move said focusing lens group is executed.

9. The optical surveying instrument indicator according to claim 1, wherein said distance detecting device calculates said object distance according to a moving amount from a reference position of said focusing lens group detected by said lens position detecting device.

10. The optical surveying instrument indicator according to claim 1 further comprising a memory, wherein said distance detecting device selects said object distance from table data corresponding to a position of said focusing lens group detected by said lens position detecting device.

11. The optical surveying instrument indicator according to claim 5, further comprising an AF start switch, wherein said distance detecting device is actuated, after said lens driving device is stopped by operation of said AF start switch, to display a detected object distance on said display device for a predetermined time.

12. The optical surveying instrument indicator according to claim 1, said instrument comprising one of an auto-level and a transit.

13. The optical surveying instrument indicator according to claim 1, further comprising a focus system that determines a defocus amount corresponding to a detected position of the focusing lens group and an in-focus state of the focusing lens group when said defocus amount corresponding to a detected position of said focusing lens group is equal to or less than a predetermined value, said object distance detecting device obtaining an object distance according to a position of said focusing lens group and according to a defocus amount at an in-focus state.

14. The optical surveying instrument according to claim 1, wherein the light from the object split by the beam splitting optical system is free of laser light.

15. An optical surveying instrument indicator, said instrument including an observational optical system to observe an image of an object, the image formed on a predetermined focal plane by an objective optical system having a focusing lens group, said indicator comprising:

a beam splitting optical system fixedly positioned between the objective system and the observational optical system, a beam from the object transmitted through said beam splitting optical system passing through the observational optical system;

a focus detecting device to detect a defocus amount at a position equivalent to said focal plane by receiving a light beam reflected by said beam splitting optical system;

a lens driving device to drive said focusing lens group according to a defocus amount detected by said focusing detecting device so that said defocus amount becomes a smallest value;

a lens position detecting device that detects a position of said focusing lens group and that outputs a lens position value;

an object distance detecting device that obtains an object distance according to a position of said focusing lens group detected by said lens position detecting device which is amended according to said defocus amount and upon the lens position value; and a display device that displays, in a visual field of said observational optical system, an object distance detected by said object distance detecting device.

16. The optical surveying instrument indicator according to claim 15, wherein said lens driving device stops movement of said focusing lens group when an absolute value of defocus amount detected by said focusing detecting device becomes smaller than a predetermined value.

17. The optical surveying instrument indicator according to claim 16, wherein said object distance detecting device obtains an object distance as an average of plural times of calculation of defocus amount via said focusing detecting device, after said lens driving device stops movement of said focusing lens group.

18. The optical surveying instrument indicator according to claim 15, wherein said display device displays, in addition to said object distance information, at least one from among the following information: focused/out-of-focus, the defocus direction, or the amount-of-defocus.

19. The optical surveying instrument indicator according to claim 15, wherein said optical instrument is a telescope comprising, in an order from the object side, a fixed objective lens group, a movable focusing lens group, an erecting optical system and an eyepiece lens group.

20. The optical surveying instrument indicator according to claim 19, wherein said surveying optical instrument is a collimating telescope of an auto-level comprising, in an order from the object side, a fixed objective lens group, a movable focusing lens group, a horizontal compensation and erecting optical system, a split optical system, a focusing plate and an eyepiece lens group.

21. The optical surveying instrument indicator according to claim 19, wherein said display device further comprises a display in the periphery of said focusing plate.

22. The optical surveying instrument indicator according to claim 13, wherein said display device further comprises a projection optical system, which emits information of said object distance on said splitting optical system, to project said information of said object distance on the periphery of said focusing plate through reflection by said splitting optical system.

23. The optical surveying instrument indicator according to claim 15, wherein said surveying optical instrument further comprises a manual focusing operation device which allows said focusing lens group to be manually adjusted.

24. The an optical surveying instrument indicator according to claim 15, wherein said distance detecting device displays said object distance via said display device by detecting said object distance when any operation to move said focusing lens group is executed.

25. The optical surveying instrument indicator according to claim 15, wherein said distance detecting device calculates said object distance according to a moving amount from a reference position of said focusing lens group detected by said lens position detecting device and according to said defocus amount.

26. The optical surveying instrument indicator according to claim 15, further comprising an AF start switch, wherein said distance detecting device is actuated, after said lens driving device is stopped via the operation of said AF start switch, to display a detected object distance on said display device for a predetermined time.

27. The optical surveying instrument indicator according to claim 15, said instrument comprising one of an auto-level and a transit.

28. The optical surveying instrument indicator according to claim 15, said focus detecting device determines a in-focus condition when said defocusing amount corresponding to a detected position of said focusing lens group is equal to or less than a predetermined value, said object distance detecting device obtaining an object distance according to a position of said focusing lens group and according to a defocus amount at an in-focus state.

29. The optical surveying instrument according to claim 15, wherein the light from the object split by the beam splitting optical system is free of laser light.

30. An optical surveying instrument comprising:
 a telescopic optical system comprising:
  an objective lens group;
  a focusing lens group;
  a focusing plate;
  an eyepiece lens group for viewing images of objects formed on said focusing plate via said objective lens group and said focusing lens group;
  a beam splitting optical system fixedly positioned between said objective lens group and said focusing plate, a beam from an object transmitted through said beam splitting optical system passing through said eyepiece lens group;
  a lens position detecting device which detects the amount of movement of said focusing lens group from a predetermined reference position;
  a focus detecting device that detects an amount of defocus of said focusing lens group;
  an object distance detecting device which detects the object distance with respect to the position of said focusing lens group;
  a display that displays, in a visual field of said observational optical system, the detected object distance according to said object distance detecting device; and
  the object distance displayed by said display device being obtained based upon said detected position of said focusing lens group which is amended based upon the amount of defocus detected by said focus detecting device and upon the detected amount of movement of said focusing lens group.

31. An optical apparatus for a surveying instrument according to claim 30, wherein said object distance detecting device calculates the object distance based on: the amount of movement of said focusing lens group obtained from said lens position detecting device, the previously determined focal length of said objective lens group, the focal length of said focusing lens group, and the distance between said objective lens group and the focusing lens group at the reference position.

32. An optical apparatus for a surveying instrument according to claim 30, wherein said instrument further comprises a memory for storing table data on the relationship between the amount of movement of said focusing lens group from said reference position and the object distance; said object distance detecting device detects said object distance by selecting from said memory the object distance corresponding to said amount of movement based on the amount of movement of said focusing lens group detected by said lens position detecting device.

33. An optical apparatus for a surveying instrument according to claim 30, wherein said instrument further comprises:
 a beam splitting optical system located between said focusing lens group and said focusing plate;
 a focus detecting device, which receives a split beam which has been split by said beam splitting optical system, for detecting the amount of defocus of an object at a position equivalent to the position of said focusing plate;

said object distance detecting device detects the corrected object distance by incorporating an average of a plurality of defocus amounts obtained by said focus detecting device.

34. An optical apparatus for a surveying instrument according to claim 30, wherein said optical apparatus further comprises:
- a beam splitting optical system located between said focusing lens group and said focusing plate;
- a focus detecting device, which receives a split beam which has been split by said beam splitting optical system, for detecting the defocus direction and amount of defocus of an object at a position equivalent to the position of the focusing plate;
- said display device displays, in addition to the object distance, at least one of the following: focused/out-of-focus, the defocus direction, or the amount-of-defocus.

35. The optical surveying instrument according to claim 30, said instrument comprising one of an auto-level and a transit.

36. The optical surveying instrument indicator according to claim 30, further comprising a focus system that determines a defocus amount corresponding to a detected amount of movement of the focusing lens group from the predetermined reference position and that determines an in-focus state when said defocus amount corresponding to a detected amount of movement of said focusing lens group is equal to or less than a predetermined value, said object distance determining device detecting an object distance according to a detected amount of movement of said focusing lens group and according to a defocus amount at an in-focus state.

37. The optical surveying instrument according to claim 30, wherein the light from the object split by the beam splitting optical system is free of laser light.

* * * * *